(12) United States Patent
Jeong et al.

(10) Patent No.: US 11,622,098 B2
(45) Date of Patent: Apr. 4, 2023

(54) ELECTRONIC DEVICE, AND METHOD FOR DISPLAYING THREE-DIMENSIONAL IMAGE THEREOF

(71) Applicant: Samsung Electronics Co., Ltd., Suwon-si (KR)

(72) Inventors: Seonghun Jeong, Suwon-si (KR); Hyoyoung Kim, Suwon-si (KR); Youngjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/347,406

(22) Filed: Jun. 14, 2021

(65) Prior Publication Data
US 2021/0306615 A1 Sep. 30, 2021

Related U.S. Application Data

(63) Continuation of application No. PCT/KR2019/015151, filed on Nov. 8, 2019.

(30) Foreign Application Priority Data

Dec. 12, 2018 (KR) .................. 10-2018-0159664

(51) Int. Cl.
*H04N 13/275* (2018.01)
*H04N 13/122* (2018.01)
*H04N 13/293* (2018.01)

(52) U.S. Cl.
CPC ......... *H04N 13/275* (2018.05); *H04N 13/122* (2018.05); *H04N 13/293* (2018.05)

(58) Field of Classification Search
USPC .......................................... 348/56
See application file for complete search history.

(56) References Cited

U.S. PATENT DOCUMENTS 7,860,340 B2  12/2010  Marugame et al.
9,020,251 B2   4/2015  Choi et al.
(Continued)

FOREIGN PATENT DOCUMENTS

EP  0717373 B1  11/2001
EP  3531370 A2   8/2019
(Continued)

OTHER PUBLICATIONS

International Search Report and Written Opinion of the International Searching Authority dated Feb. 21, 2020 in connection with International Application No. PCT/KR2019/015151, 13 pages.

(Continued)

*Primary Examiner* — Behrooz M Senfi

(57) ABSTRACT

An electronic device is disclosed. The present electronic device comprises a display, a processor electrically connected with the display so as to control the display, and a memory electrically connected with the processor, wherein the memory includes at least one command, and the processor, by executing at least one command, acquires a plurality of object images corresponding to a plurality of objects in a two-dimensional image, acquires a plurality of three-dimensional modeling images corresponding to the plurality of object images and information related to the plurality of objects by applying the plurality of object images to a plurality of network models, and displays, on the display, the three-dimensional images including the plurality of three-dimensional modeling images on the basis of the information related to the plurality of objects and the location information about the plurality of objects in the two-dimensional image.

9 Claims, 14 Drawing Sheets

(56) References Cited

U.S. PATENT DOCUMENTS

| | | |
|---|---|---|
| 9,083,968 B2 | 7/2015 | Kim |
| 9,609,307 B1 | 3/2017 | Lopez et al. |
| 9,721,385 B2 | 8/2017 | Herman |
| 9,894,346 B2 | 2/2018 | Kim |
| 10,771,763 B2 | 9/2020 | Zavesky et al. |
| 2009/0021513 A1 | 1/2009 | Joshi et al. |
| 2011/0169827 A1 | 7/2011 | Spooner et al. |
| 2011/0261076 A1* | 10/2011 | Shinohara ............. A63F 13/525 345/650 |
| 2012/0122062 A1 | 5/2012 | Yang et al. |
| 2014/0195914 A1* | 7/2014 | Gillard ............. H04N 21/47202 715/719 |
| 2017/0280130 A1 | 9/2017 | Burton |
| 2017/0287213 A1 | 10/2017 | Loper et al. |
| 2018/0293723 A1 | 10/2018 | Bae et al. |
| 2019/0130639 A1* | 5/2019 | Boyce ..................... G06F 3/013 |
| 2019/0213786 A1 | 7/2019 | Jeong et al. |
| 2020/0005444 A1* | 1/2020 | Tan ........................ G06V 20/70 |
| 2020/0134911 A1 | 4/2020 | van Hoff et al. |
| 2020/0169717 A1* | 5/2020 | Zavesky ................ G06V 20/20 |
| 2022/0101557 A1* | 3/2022 | Niday ....................... G06T 7/80 |

FOREIGN PATENT DOCUMENTS

| | | |
|---|---|---|
| KR | 10-2012-0052783 A | 5/2012 |
| KR | 10-2017-0008638 A | 1/2017 |
| KR | 10-2017-0050465 A | 5/2017 |
| KR | 10-1748674 B1 | 6/2017 |
| KR | 10-2018-0051367 A | 5/2018 |
| KR | 10-1906431 B1 | 10/2018 |
| WO | 2006049147 A1 | 5/2006 |

OTHER PUBLICATIONS

Notice of Allowance dated Jan. 25, 2023 in connection with Korean Patent Application No. 10-2018-0159664, 7 pages.

* cited by examiner

200
ELECTRONIC DEVICE, AND METHOD FOR DISPLAYING THREE-DIMENSIONAL IMAGE THEREOF

CROSS-REFERENCE TO RELATED APPLICATIONS

This application is a bypass continuation of International Application No. PCT/KR2019/015151, filed Nov. 8, 2019, which claims priority to Korean Patent Application No. 10-2018-0159664, filed Dec. 12, 2018, the disclosures of which are herein incorporated by reference in their entirety.

BACKGROUND

1. Field

This disclosure relates to an electronic device and a method for displaying a three-dimensional (3D) image thereof and, more particularly, to an electronic device displaying a 3D image and a method for displaying a 3D image thereof.

2. Description of Related Art

In recent years, artificial intelligence (AI) systems have been used in various fields. An AI system is a system in which a machine learns, judges, and becomes smart, unlike rule-based systems. As the use of AI systems improves, a recognition rate and understanding or anticipation of a user's taste may be performed more accurately. As such, rule-based systems are gradually being replaced by deep learning-based AI systems.

AI technology is composed of machine learning, for example deep learning, and elementary technologies that utilize machine learning.

Machine learning is an algorithmic technology that is capable of classifying or learning characteristics of input data. Element technology is a technology that simulates functions, such as recognition and judgment of a human brain, using machine learning algorithms, such as deep learning. Machine learning is composed of technical fields such as linguistic understanding, visual understanding, reasoning, prediction, knowledge representation, motion control, or the like.

Recently, a technology of generating a 3D modeling image from a 2D image, and generating and displaying a 3D image composed of a 3D modeling image is being progressed. In this regard, it is required a method of obtaining a human, a thing and a space (or background) in a 2D image and efficiently generating a 3D image therefrom.

SUMMARY

It is an object of the disclosure to provide an electronic device for generating a 3D image based on information obtained by applying a plurality of objects obtained from a 2D image to a plurality of network models, and a method for displaying a 3D image thereof.

According to an embodiment, an electronic device includes a display, a processor electrically connected with the display configured to control the display, a memory electrically connected with the processor, and the memory may include at least one command, and the processor may, by executing the at least one command, obtain a plurality of object images corresponding to a plurality of objects in a two-dimensional image, obtain a plurality of three-dimensional modeling images corresponding to the plurality of object images and information related to the plurality of objects by applying the plurality of object images to a plurality of network models, and display, on the display, the three-dimensional images including the plurality of three-dimensional modeling images based on the information related to the plurality of objects and the location information about the plurality of objects in the two-dimensional image.

The plurality of network models may be network models trained based on a two-dimensional image including an object, a three-dimensional modeling image corresponding to the object, and an attribute of the object.

The plurality of objects may include a human, a thing, and a background, and the processor may obtain a three-dimensional modeling image corresponding to an object image and information related to the object from respective network models by applying the plurality of object images, respectively, to the plurality of network models, respectively.

The information related to the object may include pose information of the object, information of a camera capturing the object, and depth information of the object.

The processor may match a plurality of cameras capturing the plurality of objects as a reference camera based on the information of the camera capturing the plurality of objects, and generate the three-dimensional image by positioning the plurality of three-dimensional modeling images with respect to a location of the reference camera.

The location of the reference camera may be determined based on the location information of the plurality of cameras.

The processor may, based on depth information of the plurality of objects and location information of the plurality of objects, generate the three-dimensional image by positioning the plurality of three-dimensional modeling images based on the location of the reference camera.

The location information of the plurality of objects may include information about a two-dimensional coordinate in which the plurality of objects are located in the two-dimensional image.

According to an embodiment, a method for displaying a three-dimensional image of an electronic device includes obtaining a plurality of object images corresponding to a plurality of objects in a two-dimensional image; obtaining a plurality of three-dimensional modeling images corresponding to the plurality of object images and information related to the plurality of objects by applying the plurality of object images to a plurality of network models; and displaying the three-dimensional images including the plurality of three-dimensional modeling images based on the information related to the plurality of objects and the location information about the plurality of objects in the two-dimensional image.

The plurality of network models may be network models trained based on a two-dimensional image including an object, a three-dimensional modeling image corresponding to the object, and an attribute of the object.

The plurality of objects may include a human, a thing, and a background, and the obtaining may include obtaining a three-dimensional modeling image corresponding to an object image and information related to the object from respective network models by applying the plurality of object images, respectively, to the plurality of network models, respectively.

The information related to the object may include pose information of the object, information of a camera capturing the object, and depth information of the object.

The displaying may include matching a plurality of cameras capturing the plurality of objects as a reference camera based on the information of the camera capturing the plurality of objects, and generating the three-dimensional image by positioning the plurality of three-dimensional modeling images with respect to a location of the reference camera.

The location of the reference camera may be determined based on the location information of the plurality of cameras.

The displaying may include, based on depth information of the plurality of objects and location information of the plurality of objects, generating the three-dimensional image by positioning the plurality of three-dimensional modeling images based on the location of the reference camera.

The location information of the plurality of objects may include information about a two-dimensional coordinate in which the plurality of objects are located in the two-dimensional image.

As described above, according to various embodiments, a 2D image may be converted to a 3D image with less learning data and less learning time by applying a plurality of objects to network models by objects, rather than applying a plurality of objects to one network model.

DETAILED DESCRIPTION

Figure 1:
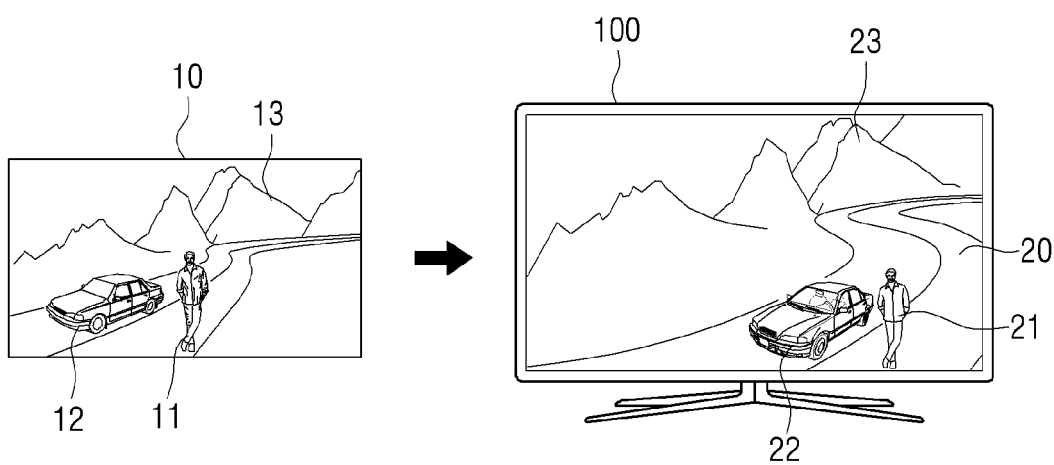
FIG. 1 illustrates a diagram of an electronic device providing a 3D image according to an embodiment of the present disclosure.

Hereinafter, various embodiments of the disclosure will be described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., elements such as a numerical value, a function, an operation, or a part), and do not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, or (3) at least one A and at least one B together.

In the description, the terms "first," "second," and so forth are used to describe diverse elements regardless of their order and/or importance, and to discriminate one element from other elements, but are not limited to the corresponding elements.

It is to be understood that an element (e.g., a first element) that is "operatively or communicatively coupled with/to" another element (e.g., a second element) may be directly connected to the other element or may be connected via another element (e.g., a third element). Alternatively, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of" The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processing unit (CPU) or application processor (AP)) that can perform the corresponding actions by executing one or more software programs stored in the memory device.

An electronic apparatus in accordance with various embodiments of the disclosure may be implemented as at least one server, but this is merely exemplary, and may be implemented as a user terminal device or a home appliance product. The electronic apparatus may include, for example, smartphones, tablet personal computers (PCs), mobile phones, video telephones, electronic book readers, desktop PCs, laptop PCs, netbook computers, workstations, servers, a personal digital assistance (PDA), a portable multimedia player (PMP), an MP3 player, a medical device, a camera, or a wearable device. The wearable device may include any one or any combination of the accessory type (e.g., as a watch, a ring, a bracelet, a bracelet, a necklace, a pair of glasses, a contact lens or a head-mounted-device (HMD)); a fabric or a garment-embedded type (e.g., an electronic clothing), a skin-attached type (e.g., a skin pad or a tattoo); or a bio-implantable circuit. In some embodiments, the electronic device may include at least one of, for example, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC, APPLE TV, or GOOGLE TV), a game console (e.g., XBOX, PLAYSTATION), an electronic dictionary, an electronic key, a camcorder, or an electronic frame.

In other embodiments, the electronic device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, or an Internet of Things (IoT) device (e.g., light bulbs, sensors, sprinkler devices, fire alarms, thermostats, street lights, toasters, exercise equipment, hot water tanks, heater, boiler, etc.).

In the disclosure, a term user may refer to a person using an electronic device or a device using an electronic device (e.g., artificial intelligence electronic device).

The disclosure will be described in detail with reference to the drawings.

FIG. 1 illustrates a diagram of an electronic device providing a 3D image according to an embodiment of the present disclosure.

As shown in FIG. 1, an electronic device 100 may obtain a plurality of objects 11, 12, and 13 in the 2D image 10, convert the obtained object into a 3D format, and display a 3D image (or 3D content) 20 in which objects 21, 22, 23 in a 3D format are disposed on the 3D space. The object may include a human, a thing, and a background.

The electronic device 100 may apply the obtained object to a network model to obtain 3D modeling images for the object and information related to the object.

The 3D modeling image represents an object indicated in a 3D format, and information related to the object may include pose information of the object, information on a camera capturing the object, and depth information of the object.

The network model may be set to estimate (or infer, determine, identify) the 3D object which represents an object in the 3D format, the degree of rotation and motion of the object, a location of the camera capturing the object, the depth of the object based on the camera or the like, by using the object obtained from the 2D image as input data.

The network model may be, for example, a model based on a neural network or deep learning.

The electronic device 100 may generate a 3D image including a plurality of 3D modeling images based on information related to an object and location information of a plurality of objects in the 2D image, and may display the generated 3D image.

The electronic device 100 may modify the poses of the plurality of 3D modeling images to conform to the poses of the plurality of objects in the 2D image based on the pose information, and place the image on the 3D space to generate a 3D image.

The electronic device 100 may arrange a plurality of 3D modeling images on the 3D space so as to correspond to the locations of the plurality of objects in the 2D image in consideration of the location of the camera capturing the plurality of objects, the depth of the plurality of objects, and the location of the plurality of objects in the 2D image.

The electronic device 100 may display a 3D image which represents a 2D image in a 3D manner.

According to an embodiment of the disclosure, the electronic device 100 may apply a plurality of objects obtained from a 2D image to a plurality of network models to obtain 3D modeling images of the object and information related to the objects from respective network models.

For example, the electronic device 100 may obtain an image of human including a human in the 2D image and apply the image of the image of human to the network model of human to obtain 3D modeling images of the human and information related to the human. The electronic device 100 may obtain an image of thing including a thing from the 2D image, and apply the image of thing to the network model of thing to obtain the 3D modeling image of the thing and the information related to the thing. The electronic device 100 may obtain an image of background including a background in a 2D image, and apply the image of background to a network model of background to obtain 3D modeling image of the background and information related to the background.

As described above, according to an embodiment, a 2D image may be converted into a 3D image even with a relatively small learning data and a learning time by applying a plurality of objects to a network model for each object, rather than applying a plurality of objects to one network model.

Figure 2A:
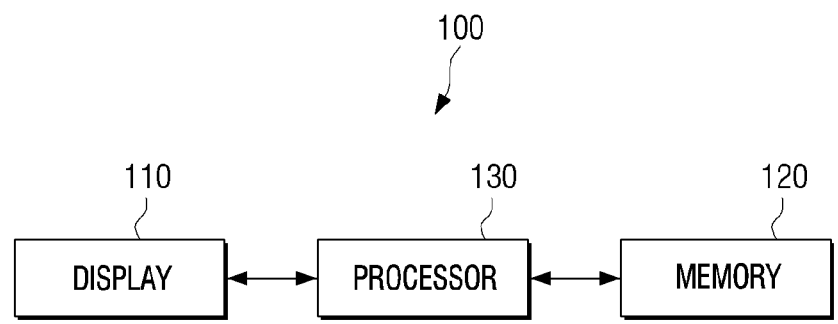
FIGS. 2A and 2B illustrate block diagrams of an electronic device according to an embodiment of the present disclosure.
Figure 2B:
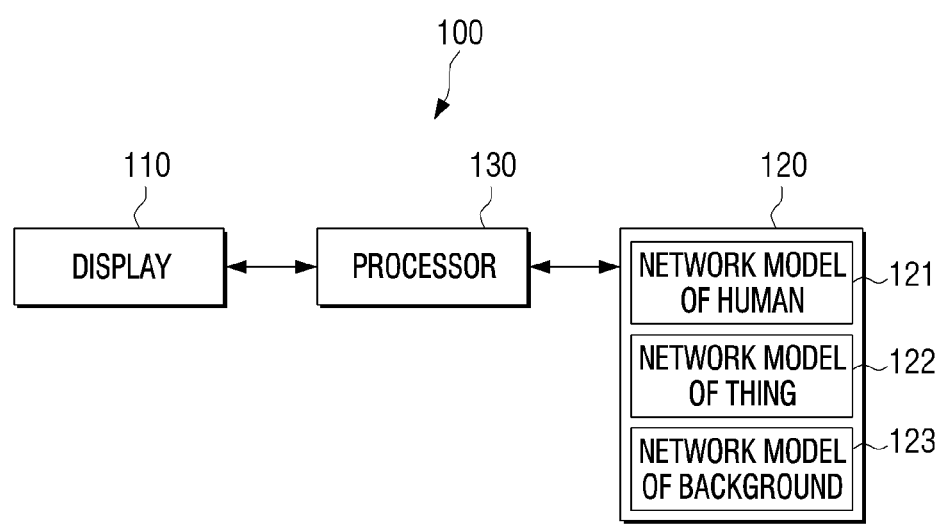

FIGS. 2A and 2B illustrate block diagrams of an electronic device according to an embodiment of the present disclosure.

Referring to FIG. 2A, the electronic device 100 includes a display 110, a memory 120, and a processor 130. The elements shown in FIG. 2A are exemplary for implementing embodiments of the disclosure, and any suitable hardware/software elements may be further included in the electronic device 100.

The display 110 may provide various screens. The display 110 may display the 3D image.

The display 110 may be implemented as a display of various types such as a liquid crystal display (LCD), and light emitting diodes (LED) display, or the like. The display 110 may be implemented as a flexible display which may be bent, curved, or rolled without damages through a substrate that is thin and flexible as paper. The display 110 may be embodied as a touch screen of a layer structure by being combined with a touch panel. The touch screen may have not only a display function but also a function to sense a touch input position, a touched area, and a touch input, and further, a function to sense not only a real touch but also a proximity touch.

The memory 120 may be electrically connected with the processor 130 and may store at least one instruction or data related to at least one element of the electronic device 100. The memory 120 may be embodied as a non-volatile memory, volatile memory, flash memory, hard disk drive (HDD), or solid state drive (SSD). The memory 120 may be accessed by the processor 130, and reading/recording/correcting/deleting/renewing of data may be performed by the processor 130. In the disclosure, the term memory may include the memory 120, ROM (not shown) within the processor 130, RAM (not shown), or a memory card (not shown) installed in the electronic device 100 (now shown) (for example, micro SD card, memory stick). The memory 120 may store a program, data, or the like, to form various screens to be displayed on the display 110.

The memory 120 may store a network model.

The network model may be set to estimate a 3D modeling image for an object and information related to the object by using the 2D object image including an object as input data.

The 3D modeling image represents an object included in the 2D object image in a 3D format, and the information related to the object may include pose information of the object, information about a camera capturing the object, and depth information of the object.

The network model may be trained based on the 2D image including the object, the 3D modeling image corresponding to the object and an attribute of the object.

The network model may be trained to have a criterion for identifying what is a 3D modeling image representing an object in a 3D format, what is a degree of rotation and motion of the object, what is a location of a camera capturing an object of the 2D image, and what is a depth of an object based on the camera, by using a 2D image including an object, a 3D modeling image representing an object in a 3D format, size, format, age, gender, or the like, of the object as learning data.

For example, the network model may identify what is the 3D modeling image which represents the object in a 3D format according to the feature and format of the object included in the 2D image which is the input data, by learning the feature and format of the object included in the 2D image, a 3D modeling image which represents the object in a 3D format, or the like.

The network model may learn the format, or the like, of the object included in the 2D image, and may identify what is the degree of rotation and motion of the object included in the 2D image, which is the input data. For example, the network model may identify what is the degree of rotation of the object and the pose of the object included in the 2D image, which is the input data, by learning the pose of the object facing the front surface included in the 2D image.

The network model may learn the size, format, age, gender, etc. of the object included in the 2D image to identify the location of the camera capturing the image in the 2D image and the depth of the object based on the camera, depending on the size and format of the object included in the 2D image which is input data. For example, the network model may learn a location of a camera capturing a corresponding object and a depth of an object according to the size of an object included in the 2D image, and may identify the location of the camera capturing the object included in the 2D image which is input data and depth of the object based on the camera. As another example, the network model may learn that the objects of the same size according to age and gender of the object are captured at different depths, and may identify the location of the camera capturing the object included in the 2D image which is the input data and the depth of the object based on the camera.

This is merely exemplary and a network model may be trained in various manners.

Accordingly, the network model may use the 2D image including the object as input data to estimate information on the 3D modeling image which represents the object included in the 2D image in the format of 3D, information on the degree of rotation and motion of the object, and information on the location of the camera capturing the object of the 2D image and the depth of the object.

For example, the network model may be a model based on a neural network. The network model may include a plurality of weighted network nodes that correspond to a neuron of a human neural network. The plurality of network nodes may each establish a connection relation so that the neurons simulate synaptic activity of transmitting and receiving signals through synapses. For example, the network model may include, for example, a deep learning model. In the deep learning model, a plurality of network nodes is located at different depths (or layers) and may exchange data according to a convolution connection.

For example, the network model may include a deep neural network (DNN), a convolutional neural network (CNN), recurrent neural network (RNN), and bidirectional recurrent deep neural network (BRDNN), but is not limited thereto.

The memory 120 may store a plurality of network models. Here, the plurality of network models may include a network model of human 121, a network model of thing 122, and a network model of background 123, as shown in FIG. 2B.

The network model of human 121 may be a 2D image including a human, a 3D modeling image corresponding to a human, and a network model trained using a human's attribute (e.g., size of a human, shape, age, gender, etc.) as learning data. In this case, the network model of human 121 may use a 2D image including a human as input data to obtain information about a 3D modeling image and information about a human.

The network model of thing 122 may be a network model trained using a 2D image including a thing, a 3D modeling image corresponding to the thing, and an attribute of the thing (e.g., size, shape, etc.) as learning data. In this case, the network model of thing 122 may use the 2D image including the thing as input data to obtain information on the 3D modeling image and the information about the thing.

The network model of background 123 may be network model trained using a 2D image including a background, a 3D modeling image corresponding to the background, and an attribute of the background (e.g., size, shape, etc.) of the background as learning data. The network model of background 123 may use the 2D image including the background as input data to obtain information about the 3D modeling image and the background corresponding to the background.

As described above, according to an embodiment, a plurality of network models 121, 122, and 123 for estimating a 3D modeling image, or the like, for a 2D object may be stored in the memory 120 according to the type of the object.

The processor 130 may be electrically connected to the display 110 and the memory 120 and may control an overall operation and function of the electronic device 100.

The processor 130 may generate a 3D image based on the 2D image and may display a 3D image through the display 110.

The processor 130 may obtain a plurality of object images corresponding to a plurality of objects from a 2D image. The plurality of objects may include a human, a thing, and a background.

The 2D image may be an image stored in the electronic device 100 or may be received from an external device (e.g., web server or another electronic device).

The processor 130 may recognize a human, a thing, and a background in a 2D image through an object recognition method or the like, and obtain an image of human including a human, an image of thing including the thing, and an image of background including a background. The processor 130 may obtain an image of each region including the human, the thing, and the background in the form of an image clip from the 2D image.

Figure 3:
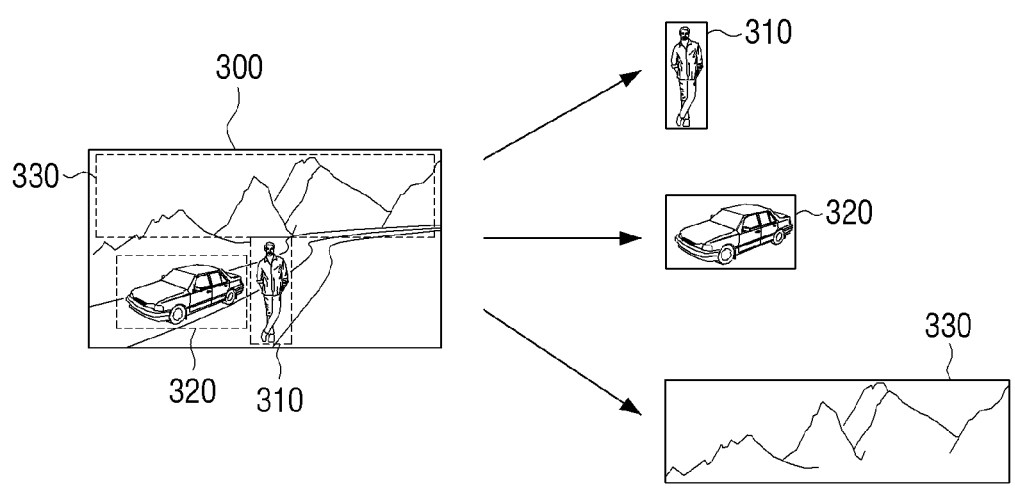
FIGS. 3, 4, 5, 6, 7, 8, and 9 illustrate diagrams of a method for generating a 3D image according to an embodiment of the present disclosure.

FIGS. 3, 4, 5, 6, 7, 8, and 9 illustrate diagrams of a method for generating a 3D image according to an embodiment of the present disclosure. As shown in FIG. 3, it is assumed that a 2D image 300 including a human, a vehicle, and a mountain exists. In this example, the processor 130 may recognize a human, a vehicle, and a background in the 2D image 300 and obtain an image of human 310 including a human, an image of vehicle 320 including a vehicle, and an image of background 330 including background.

The processor 130 may obtain location information of a plurality of objects included in the 2D image.

The location information of a plurality of objects may include information about 2D coordinates in which a plurality of objects are located in the 2D image.

The processor 130 may obtain coordinates of the center of the region including the plurality of objects in the 2D image as coordinate information in which the plurality of objects are located in the 2D image.

Figure 4:
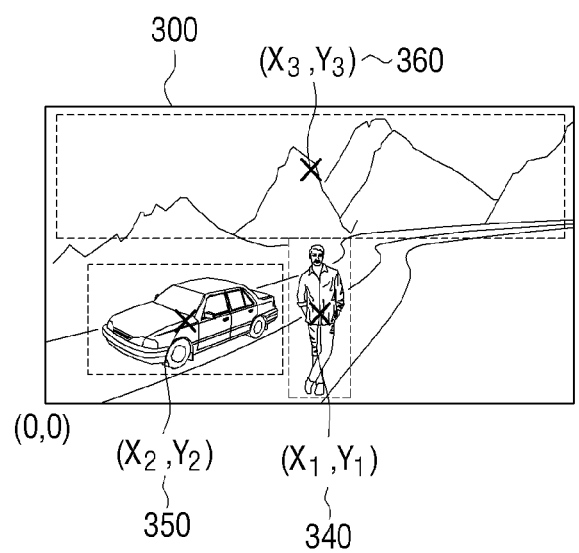

As shown in FIG. 4, for example, the processor 130 may obtain the central coordinate $(x_1, y_1)$ 340 of an area in which a human 310 is included in the 2D image as coordinate information of a human with respect to the reference coordinate (e.g., 0, 0) of the 2D image, obtain the coordinate ($x_2$, $y_2$) 350 of the center of an area in which a vehicle 320 is included in the 2D image as coordinate information of the vehicle with respect to the reference coordinate of the 2D image, and may obtain coordinate ($x_3$, $y_3$) 360 of the center of an area in which a background 330 is included in the 2D image as the coordinate information of the background.

The processor 130 may apply a plurality of object images to a plurality of network models to obtain a plurality of 3D modeling images corresponding to the plurality of object images and information related to the plurality of objects.

In this example, the processor 130 may apply each of the plurality of object images to each of the plurality of network models to obtain 3D modeling images corresponding to the object image and information related to the object from each network model.

The processor 130 may apply the image of human obtained from the 2D image to the network model of human, apply the image of thing obtained from the 2D image to the network model of thing, and apply the image of background obtained from the 2D image to the network of background model.

It may be assumed that the processor 130 obtains an image of human, an image of thing, and an image of background from a 2D image.

Figure 5:
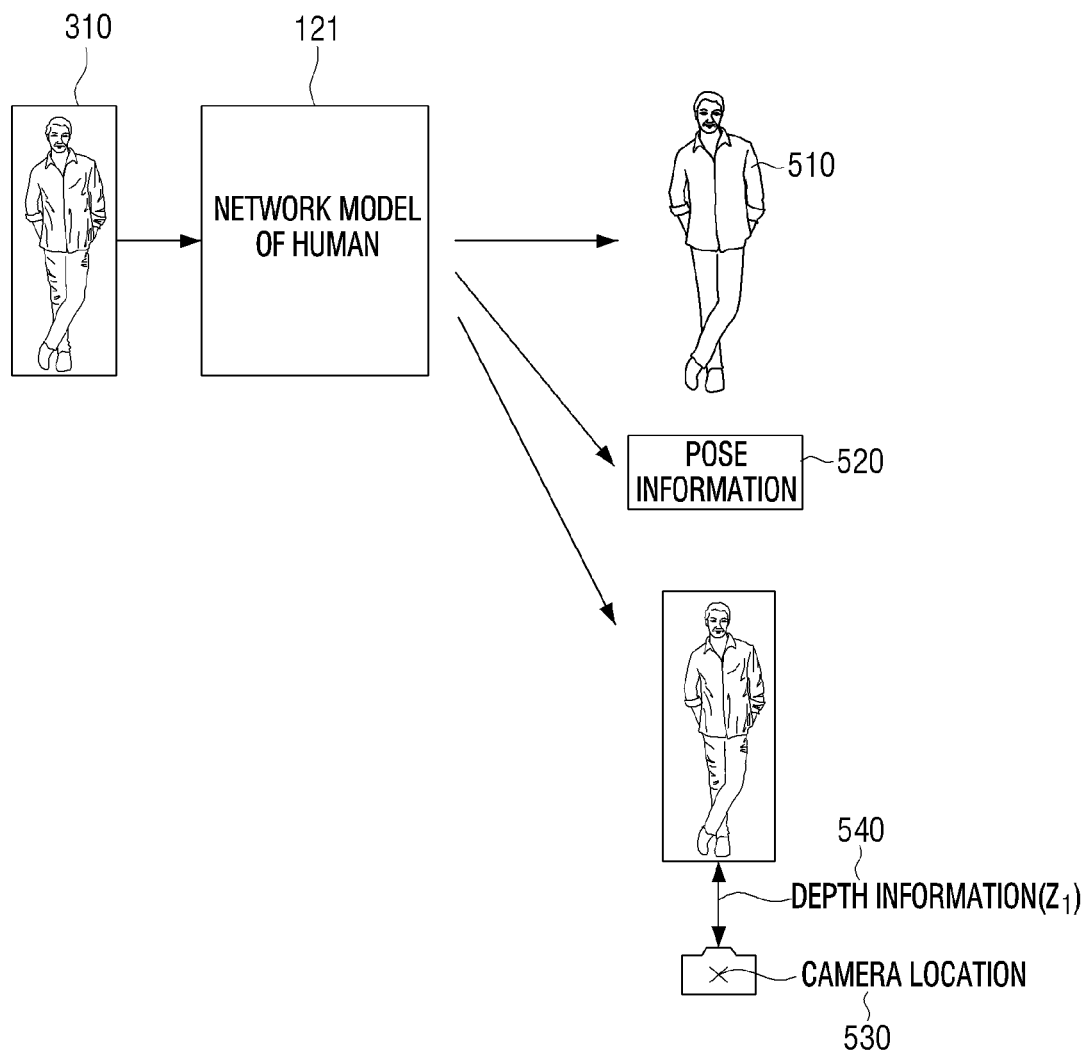

In this case, as shown in FIG. 5, the processor 130 may apply the image of human 310 to the network model of human 121 to obtain information on the 3D modeling image which represents a human in the form of a 3D form, pose information 520 including information on the degree of rotation and motion of the human, a location 530 of the camera capturing the human in the 2D image, and information on the depth $z_1$ 540 of the human based on the camera.

Figure 6:
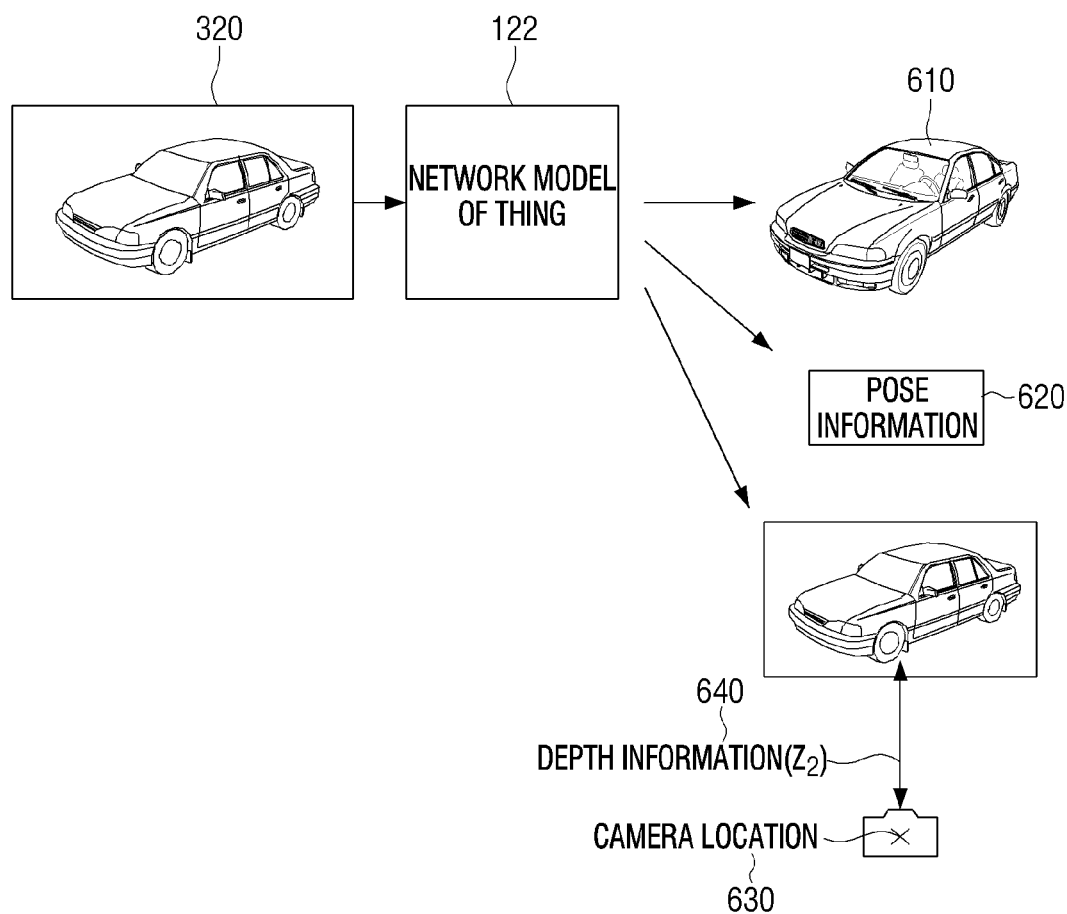

As shown in FIG. 6, the processor 130 may apply the image of vehicle 320 to the network model of thing 122 to obtain information 610 on the 3D modeling image which represents the vehicle in the form of a 3D, pose information 620 including information on the degree of rotation and motion of the vehicle, a location 630 of the camera capturing the vehicle in the 2D image, and information on the depth ($z_2$) 640 of the vehicle based on the camera.

Figure 7:
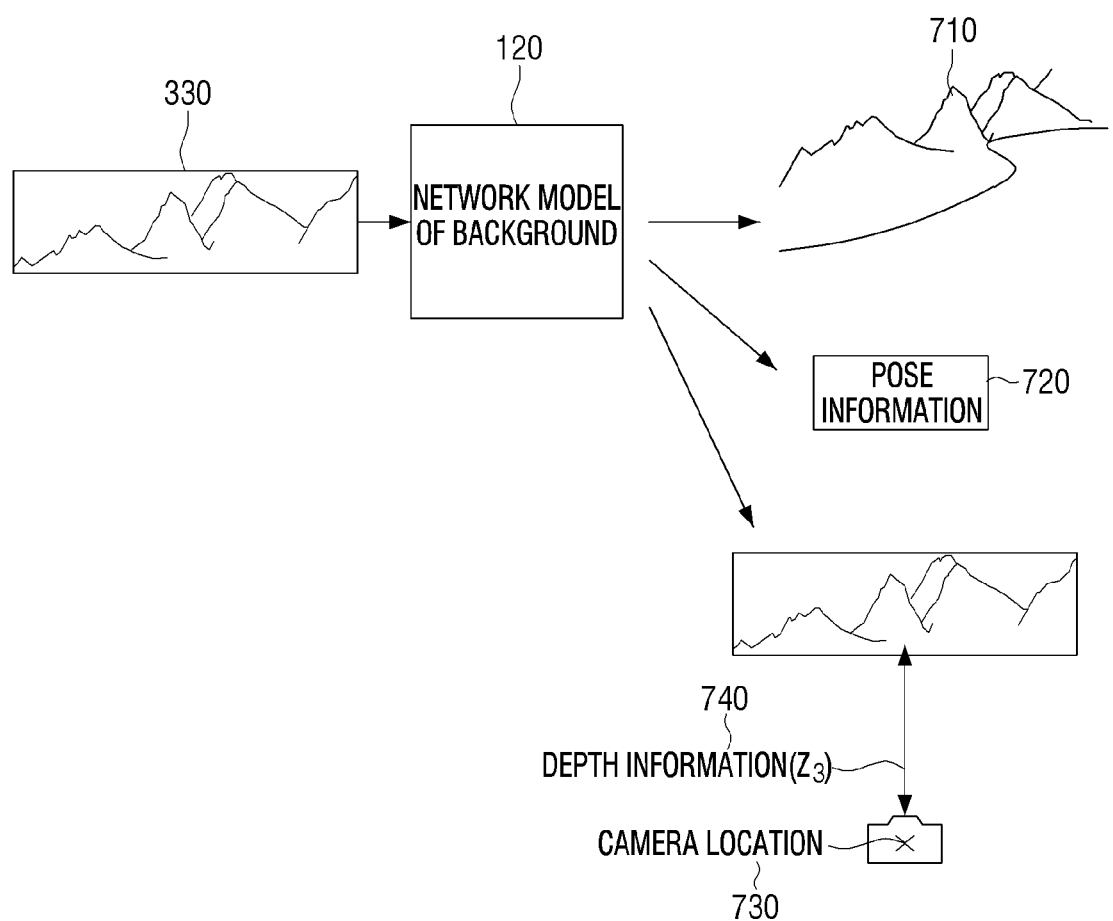

As shown in FIG. 7, the processor 130 may apply the image of background 330 to the network model of background 123 to obtain information on the 3D modeling image 710 which represents the background in the form of a 3D, pose information 720 including information on the degree of rotation and motion of the background, location 730 of the camera photographing the background in the 2D image, and information on the depth ($z_3$) 740 of the background based on the camera.

The processor 130 may deform the pose of the plurality of 3D modeling images based on the information of poses of a plurality of objects obtained from a plurality of network models.

The processor 130 may modify the pose of the 3D modeling image to match the pose of the object in the 2D image based on information about the degree of rotation and motion of the object obtained from each network model.

For example, if a person in a 2D image takes a pose of holding both arms, the image may be modified so that both arms of the 3D modeling image of the human are held up based on motion information obtained from a network model of human. As another example, when the vehicle is rotated at a predetermined angle in the 2D image, the 3D modeling image of the vehicle may be rotated by a predetermined angle based on the information on the rotation angle obtained from the network model of thing.

The processor 130 may match a plurality of cameras capturing the plurality of objects as a reference camera on the basis of the information about the camera capturing the plurality of objects, and may generate a 3D image based on the position of the reference camera by positioning the plurality of 3D modeling images.

The location of the camera inferred at each of the plurality of network models may be different from one another, and an adjustment to the location of these cameras is required to position the plurality of 3D modeling images on one three-dimensional space.

The processor 130 may set one reference camera and may adjust the location of the camera obtained from different network models.

The location of the reference camera may be determined based on the information about locations of a plurality of cameras.

For example, the processor 130 may set a position of one camera to a reference camera position among positions of a plurality of cameras obtained from a plurality of network models. As another example, the processor 130 may set a point which is a middle of a location of a plurality of cameras obtained from a plurality of network models to a reference camera position.

Based on the depth information of the plurality of objects and the location information of the plurality of objects, the processor 130 may position the plurality of 3D modeling images on the basis of the position of the reference camera to generate a 3D image.

The processor 130 may match the position of the camera obtained from each network model to the reference camera position. In addition, the processor 130 may identify a point where the 3D modeling image is located on the three-dimensional space by using the depth of the object obtained from each network model and the two-dimensional coordinates in which the object is located in the 2D image.

For example, the processor 130 may position the object in the x, y plane based on the two-dimensional coordinate (x, y) in which the object is located in the 2D image, and identify a point which is distant from the reference camera position by the depth (z) of the object in the Z-axis direction as the point where the 3D modeling image is positioned.

However, this is merely an example, and a 3D modeling image may be positioned on a three-dimensional space through various methods capable of positioning an object on a three-dimensional space based on information on two-dimensional coordinates and depth.

The processor 130 may position the plurality of 3D modeling images modified according to the pose information on an identified position on the 3D space to generate a 3D image.

Figure 8:
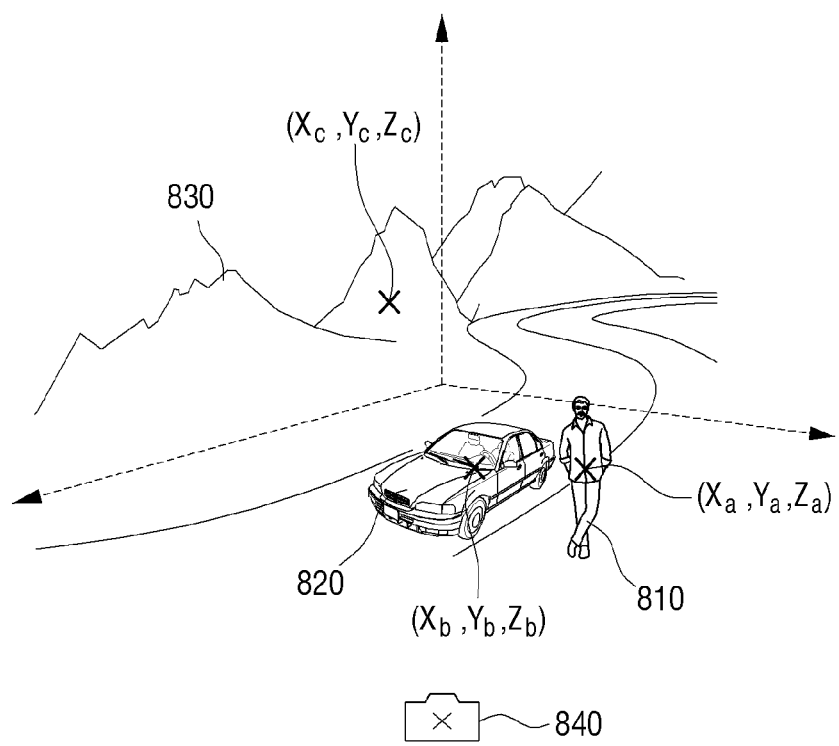

For example, when a reference camera 840 is positioned as shown in FIG. 8, the processor 130 may position a 3D modeling image 810 of a human on the coordinate ($x_a$, $y_a$, $z_a$) on the 3D space determined based on the coordinate information of a human in the 2D image location of the camera obtained from the network model of human and depth information of a human, position a 3D modeling image 820 of a vehicle on a coordinate ($x_b$, $y_b$, $z_b$) on a 3D space determined based on the coordinate information of a vehicle in the 2D image, position of a camera obtained from the network model of thing, and depth information of the vehicle, and may position a 3D modeling image 830 of a background on the coordinate ($x_c$, $y_c$, $z_c$) on the 3D space determined based on the coordinate information of a background in the 2D image location of the camera obtained from the network model of background and depth information of background.

Figure 9:
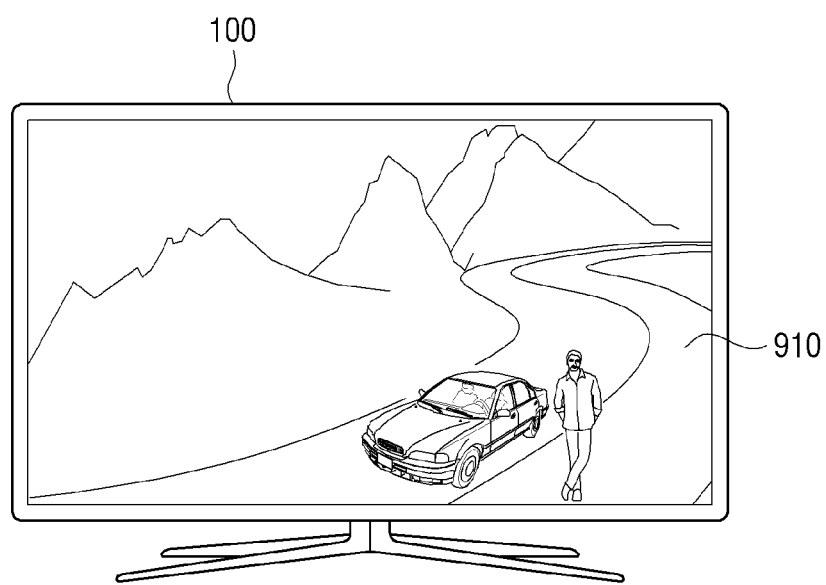

The processor 130 may display a 3D image 910 including 3D modeling images 810, 820, 830 as illustrated in FIG. 9.

As described above, according to various embodiments, in that different network models are used according to the type of an object included in a 2D image, a 2D image may be converted into a 3D image even with a relatively small learning data and a learning time than applying a plurality of objects to one network model.

Figure 10:
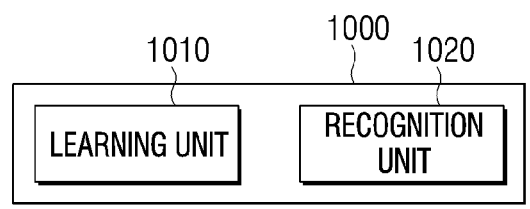
FIGS. 10, 11A, and 11B illustrate block diagrams of a learning unit and a recognition unit according to various embodiments of the present disclosure.
Figure 11A:
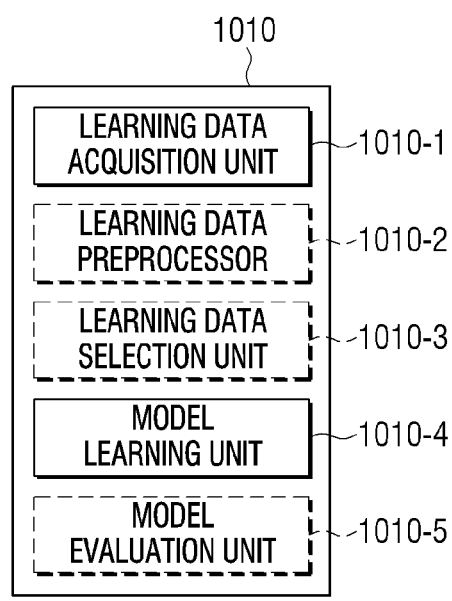
Figure 11B:
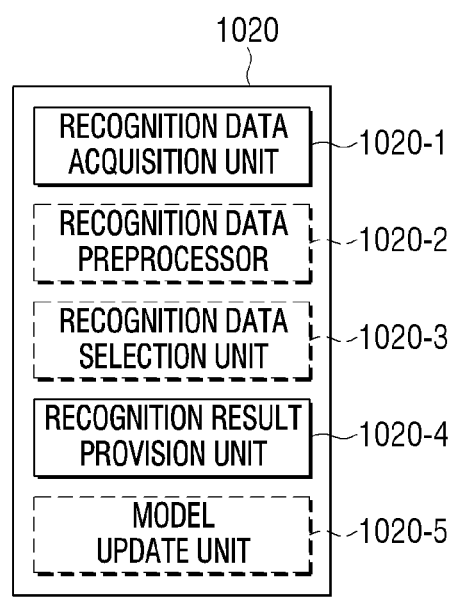

FIGS. 10, 11A, and 11B illustrate block diagrams of a learning unit and a recognition unit according to various embodiments of the present disclosure. A processor 1000 of FIG. 10 may correspond to the processor 130 of the electronic device 100 of FIGS. 2A and 2B.

A learning unit 1010 may generate or train a network model having criteria for identifying a predetermined situation. The learning unit 1010 may generate a network model having an identification criterion using the collected learning data.

For example, the learning unit 1010 may generate, train, or update a network model having a reference to determine what is a 3D modeling image representing an object in a 3D format, what is a degree of rotation and motion of the object, and what is the depth of the object based on the position of the camera capturing the object of the 2D image and the camera, by using the 2D image including an object, a 3D modeling image representing an object in a 3D format, a size, shape, age, gender, and the like of the object as learning data.

A recognition unit 1020 may estimate the recognition target corresponding to the predetermined data by using the predetermined data as input data of the trained network model.

As an example, the recognition unit 1020 may obtain (or estimate, infer) information on the depth of the object, based on the 3D modeling image which represents the object in a 3D format, the degree of rotation of the object and the motion, the position of the camera that captures the object of the 2D image, and the camera, by using the 2D image including the object as input data of the trained network model.

At least a portion of the learning unit 1010 and at least a portion of the recognition unit 1020 may be implemented as software modules or at least one hardware chip form and mounted in the electronic device 100. For example, at least one of the learning unit 1010 and the recognition unit 1020 may be manufactured in the form of an exclusive-use hardware chip for artificial intelligence (AI), or a conventional general purpose processor (e.g., a CPU or an application processor) or a graphics-only processor (e.g., a GPU) and may be mounted on various electronic devices as described above. Herein, the exclusive-use hardware chip for artificial intelligence is a dedicated processor for probability calculation, and it has higher parallel processing performance than a general purpose processor, so it can quickly process computation tasks in artificial intelligence such as machine learning. When the learning unit 1010 and the recognition unit 1020 are implemented as a software module (or a program module including an instruction), the software module may be stored in a computer-readable non-transitory computer readable media. In this case, the software module may be provided by an operating system (OS) or by a predetermined application. Alternatively, some of the software modules may be provided by an O/S, and some of the software modules may be provided by a predetermined application.

In this case, the learning unit 1010 and the recognition unit 1020 may be mounted on one electronic device, or may be mounted on separate electronic devices, respectively. For example, one of the learning unit 1010 and the recognition unit 1020 may be implemented in the electronic device 100, and the other one may be implemented in an external server. In addition, the learning unit 1010 and the recognition unit 1020 may provide the model information constructed by the learning unit 1010 to the recognition unit 1020 via wired or wireless communication, and provide data which is input to the recognition unit 1020 to the learning unit 1010 as additional data.

FIG. 11A illustrates a block diagram of the learning unit 1010 and FIG. 11B illustrates a block diagram of the recognition unit 1020 according to an embodiment of the present disclosure.

Referring to FIG. 11A, the learning unit 1010 according to some embodiments may implement a learning data acquisition unit 1010-1 and a model learning unit 1010-4. The learning unit 1010 may further selectively implement at least one of a learning data preprocessor 1010-2, a learning data selection unit 1010-3, and a model evaluation unit 1010-5.

The learning data acquisition unit 1010-1 may obtain learning data necessary for the network model to infer a recognition target. According to an embodiment, the learning data acquisition unit 1010-1 may obtain at least one of the size, shape, age, gender, or the like, of the object and the 3D modeling image which represents the 2D image and the object in the 3D format as learning data. The learning data may be data collected or tested by the learning unit 1010 or the manufacturer of the learning unit 1010.

The model learning unit 1010-4 may use the learning data so that the artificial intelligence model has a criterion for identifying a predetermined recognition target by the network model. For example, the model learning unit 1010-4 may train the network model through supervised learning using at least a part of the learning data as a criterion for identification. Alternatively, the model learning unit 1010-4 may learn, for example, by itself using learning data without specific guidance to make the network model learn through unsupervised learning which detects a criterion for discovering a criterion for identification for identifying a situation. Also, the model learning unit 1010-4 may train the network model through reinforcement learning using, for example, feedback on whether the result of identifying a situation according to learning is correct. The model learning unit 1010-4 may also make the network model learn using, for example, a learning algorithm including an error back-propagation method or a gradient descent.

In addition, the model learning unit 1010-4 may learn a selection criterion about which learning data should be used for estimating a recognition target using input data.

When the network model is trained, the model learning unit 1010-4 may store the trained network model. In this case, the model learning unit 1010-4 may store the trained artificial intelligence model in the memory 120 of the electronic device 100. Alternatively, the model learning unit 1010-4 may store the trained network model in a memory of a server or an electronic device connected to the electronic device 100 via a wired or wireless network.

The learning unit 1010 may further implement a learning data preprocessor 1010-2 and a learning data selection unit

1010-3 to improve the analysis result of the network model or to save resources or time required for generation of the network model.

The learning data preprocessor 1010-2 may preprocess obtained data so that the obtained data may be used in the learning for identifying a situation. That is, the learning data preprocessor 1010-2 may process the obtained data into a predetermined format so that the model learning unit 1010-4 may use the obtained data for learning to identify a situation.

The learning data selection unit 1010-3 may select data required for learning from the data obtained by the learning data acquisition unit 1010-1 or the data preprocessed by the learning data preprocessor 1010-2. The selected learning data may be provided to the model learning unit 1010-4. The learning data selection unit 1010-3 may select learning data necessary for learning from the obtained or preprocessed data in accordance with a predetermined selection criterion. The learning data selection unit 1010-3 may also select learning data according to a predetermined selection criterion by learning by the model learning unit 1010-4.

The learning unit 1010 may further implement a model evaluation unit 1010-5 to improve an analysis result of the network model.

The model evaluation unit 1010-5 may input evaluation data to the network model, and if the analysis result which is output from the evaluation result does not satisfy a predetermined criterion, the model evaluation unit may make the model learning unit 1010-4 learn again. In this example, the evaluation data may be predefined data for evaluating a network model.

For example, the model evaluation unit 1010-5 may evaluate that, among the analysis results of the trained network model with respect to the evaluation data, the analysis result does not satisfy a predetermined criterion when the number or ratio of evaluation data with inaccurate analysis result exceeds a predetermined threshold.

Referring to FIG. 11B, the recognition unit 1020 according to some embodiments may implement a recognition data acquisition unit 1020-1 and a recognition result provision unit 1020-4. In addition, the recognition unit 1020 may further implement at least one of a recognition data preprocessor 1020-2, a recognition data selection unit 1020-3, and a model update unit 1020-5 in a selective manner.

The recognition data acquisition unit 1020-1 may obtain data necessary for identifying the situation. The recognition result provision unit 1020-4 may apply the data obtained from the recognition data acquisition unit 1020-1 to the trained artificial intelligence model as an input value to identify a situation. The recognition result provision unit 1020-4 may provide an analysis result according to a purpose of analysis of data. The recognition result provision unit 1020-4 may apply the data selected by the recognition data preprocessor 1020-2 or the recognition data selection unit 1020-3 to be described later to the network model to obtain the analysis result. The analysis result may be determined by the network model.

According to an embodiment, the recognition result provision unit 1020-4 may obtain (or estimate) information on the depth of the object based on the 3D modeling image which represents the object in a 3D format, the degree of rotation of the object and the motion, location of the camera capturing the object of the 2D image, and the camera, by applying the object image obtained from the recognition data acquisition unit 1020-1 to the trained network model.

The recognition unit 1020 may further implement the recognition data preprocessor 1020-2 and the recognition data selection unit 1020-3 in order to improve an analysis result of the network model or save resources or time to provide the analysis result.

The recognition data preprocessor 1020-2 may preprocess the obtained data so that the obtained data may be used to identify the situation. That is, the recognition data preprocessor 1020-2 may process the obtained data into the predefined format so that the recognition result provision unit 1020-4 may use the obtained data for identifying a situation.

The recognition data selection unit 1020-3 may select data required for identifying a situation from the data obtained by the recognition data acquisition unit 1020-1 or the data preprocessed by the recognition data preprocessor 1020-2. The selected data may be provided to the recognition result provision unit 1020-4. The recognition data selection unit 1020-3 may select some or all of the obtained or preprocessed data according to a predetermined selection criterion for identifying a situation. The recognition data selection unit 1020-3 may also select data according to a predetermined selection criterion by learning by the model learning unit 1010-4.

The model update unit 1020-5 may control the updating of the network model based on the evaluation of the analysis result provided by the recognition result provision unit 1020-4. For example, the model update unit 1020-5 may provide the analysis result provided by the recognition result provision unit 1020-4 to the model learning unit 1010-4 so that the model learning unit 1010-4 may ask for further learning or updating the network model.

Figure 12:
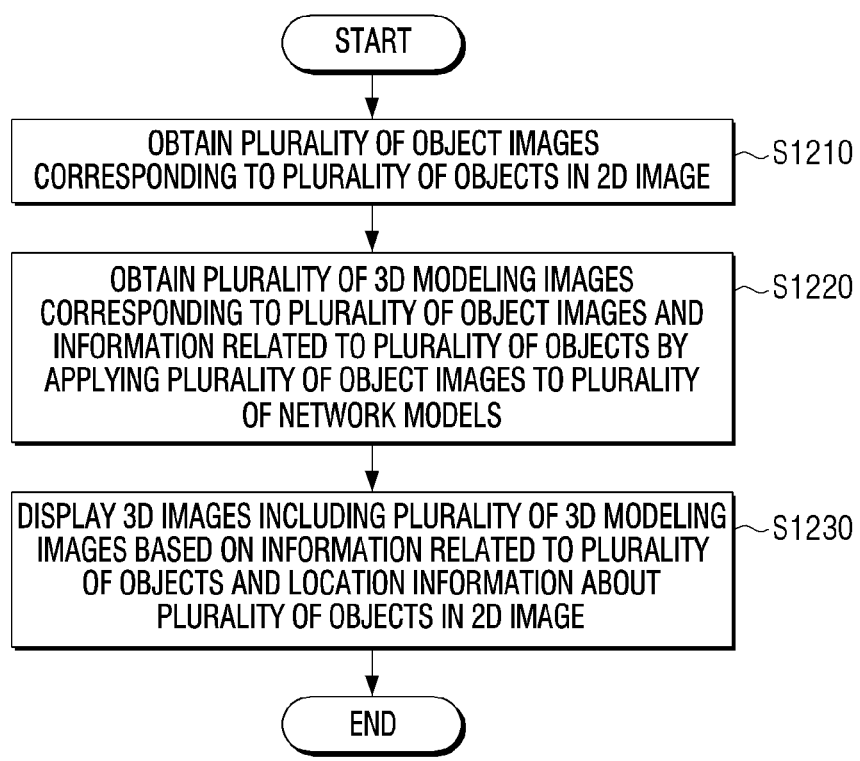
FIG. 12 illustrates a diagram of a method for displaying a 3D image by the electronic device according to an embodiment of the present disclosure.

FIG. 12 illustrates a diagram of method for displaying a 3D image by the electronic device according to an embodiment of the present disclosure.

A plurality of object images corresponding to a plurality of objects are obtained in a two-dimensional image in operation S1210.

A plurality of three-dimensional modeling images corresponding to the plurality of object images and information related to the plurality of objects are obtained by applying the plurality of object images to a plurality of network models in operation S1220.

The three-dimensional images including the plurality of three-dimensional modeling images are displayed based on the information related to the plurality of objects and the location information about the plurality of objects in the two-dimensional image in operation S1230.

The plurality of network models may be network models trained based on a two-dimensional image including an object, a three-dimensional modeling image corresponding to the object, and an attribute of the object.

The plurality of objects include a human, a thing, and a background, and the operation S1220 may include obtaining a three-dimensional modeling image corresponding to an object image and information related to the object from respective network models by applying the plurality of object images, respectively, to the plurality of network models, respectively.

The information related to the object may include pose information of the object, information of a camera capturing the object, and depth information of the object.

In operation S1230, the displaying may include matching a plurality of cameras capturing the plurality of objects as a reference camera based on the information of the camera capturing the plurality of objects, and generating the three-dimensional image by positioning the plurality of three-dimensional modeling images with respect to a location of the reference camera.

The location of the reference camera may be determined based on the location information of the plurality of cameras.

In operation S1230, the displaying may include, based on depth information of the plurality of objects and location information of the plurality of objects, generating the three-dimensional image by positioning the plurality of three-dimensional modeling images based on the location of the reference camera.

The location information of the plurality of objects may include information about a two-dimensional coordinate in which the plurality of objects are located in the two-dimensional image.

A specific method of generating a 3D image has been described above.

In accordance with the embodiment of the present disclosure, the various embodiments described above may be practiced with other computer-readable media including instructions stored on a storage medium readable by a machine (e.g., computer). The device may include an electronic device (e.g., electronic device 100) in accordance with the disclosed embodiments as an apparatus that is operable to invoke stored instructions from the storage medium and act upon the called instructions. When an instruction is executed by a processor, the processor may perform the function corresponding to the instruction, either directly, or using other components under the control of the processor. The instructions may include code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

Also, in accordance with one embodiment of the present disclosure, a method according to various embodiments described above may be provided in a computer program product. A computer program product may be traded between a seller and a purchaser as a commodity. A computer program product may be distributed in the form of a machine-readable storage medium (e.g., compact disc read only memory (CD-ROM)) or distributed online through an application store (e.g. PLAYSTORE). In the case of on-line distribution, at least a portion of the computer program product may be stored temporarily, or at least temporarily, in a storage medium such as a manufacturer's server, a server of an application store, or a memory of a relay server.

Further, each of the components (for example, modules or programs) according to the above-described various embodiments may be composed of one or a plurality of entities, and some subcomponents of the above-mentioned subcomponents may be omitted, or other subcomponents may be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitive, or heuristically manner, or at least some operations may be performed in a different order, or another operation may be added.

What is claimed is:

1. An electronic device comprising:
   a display;
   a memory; and
   a processor operably connected with the display and the memory and configured to:
   obtain a plurality of object images corresponding to a plurality of objects in a two-dimensional image,
   obtain a plurality of three-dimensional modeling images corresponding to the plurality of object images and information related to the plurality of objects by applying the plurality of object images to a plurality of network models, and
   display, on the display, three-dimensional images including the plurality of three-dimensional modeling images based on the information related to the plurality of objects and location information of the plurality of objects in the two-dimensional image,
   wherein the plurality of objects comprise a human, a thing, and a background,
   wherein the processor is further configured to obtain a three-dimensional modeling image corresponding to an object image and information related to one object of the plurality of objects from respective network models by applying the plurality of object images, respectively, to the plurality of network models, respectively,
   wherein the information related to the one object comprises pose information of the one object, information of a camera capturing the one object, and depth information of the one object, and
   wherein the processor is further configured to:
   match a plurality of cameras capturing the plurality of objects as a reference camera based on the information of the camera capturing the plurality of objects, and
   generate the three-dimensional images by positioning the plurality of three-dimensional modeling images with respect to a location of the reference camera.

2. The electronic device of claim 1, wherein the plurality of network models are network models trained based on a two-dimensional image including an object, a three-dimensional modeling image corresponding to the object, and an attribute of the object.

3. The electronic device of claim 1, wherein the location of the reference camera is determined based on the location information of the plurality of cameras.

4. The electronic device of claim 1, wherein, based on depth information of the plurality of objects and the location information of the plurality of objects, the processor is further configured to generate the three-dimensional images by positioning the plurality of three-dimensional modeling images based on the location of the reference camera.

5. The electronic device of claim 4, wherein the location information of the plurality of objects comprises information about a two-dimensional coordinate in which the plurality of objects are located in the two-dimensional image.

6. A method for displaying a three-dimensional image of an electronic device, the method comprising:
   obtaining a plurality of object images corresponding to a plurality of objects in a two-dimensional image;
   obtaining a plurality of three-dimensional modeling images corresponding to the plurality of object images and information related to the plurality of objects by applying the plurality of object images to a plurality of network models; and
   displaying three-dimensional images including the plurality of three-dimensional modeling images based on the information related to the plurality of objects and location information of the plurality of objects in the two-dimensional image, wherein the plurality of objects comprise a human, a thing, and a background, wherein the obtaining comprises obtaining a three-dimensional modeling image corresponding to an object image and information related to one object of the plurality of objects from respective network models by applying the plurality of object images, respectively, to the plurality of network models, respectively, wherein the information related to the one object comprises pose information of the one object, information of a camera capturing the one object, and depth information of the one object, and wherein the displaying the three-dimensional images comprises:

matching a plurality of cameras capturing the plurality of objects as a reference camera based on the information of the camera capturing the plurality of objects, and generating the three-dimensional image by positioning the plurality of three-dimensional modeling images with respect to a location of the reference camera.

7. The method of claim 6, wherein the plurality of network models are network models trained based on a two-dimensional image including an object, a three-dimensional modeling image corresponding to the object, and an attribute of the object.

8. The method of claim 6, wherein the location of the reference camera is determined based on the location information of the plurality of cameras.

9. The method of claim 6, wherein, based on depth information of the plurality of objects and location information of the plurality of objects, the method comprises generating the three-dimensional image by positioning the plurality of three-dimensional modeling images based on the location of the reference camera.

* * * * *